(12) United States Patent
Prince

(10) Patent No.: US 9,057,396 B2
(45) Date of Patent: Jun. 16, 2015

(54) LUG NUT LOCKING DEVICE

(71) Applicant: Lenny Prince, Lantier (CA)

(72) Inventor: Lenny Prince, Lantier (CA)

(*) Notice: Subject to any disclaimer, the term of this patent is extended or adjusted under 35 U.S.C. 154(b) by 103 days.

(21) Appl. No.: 13/987,966

(22) Filed: Sep. 19, 2013

(65) Prior Publication Data
US 2015/0078855 A1     Mar. 19, 2015

(51) Int. Cl.
F16B 31/02    (2006.01)
F16B 39/10    (2006.01)
F16B 39/28    (2006.01)

(52) U.S. Cl.
CPC ............... *F16B 31/02* (2013.01); *F16B 39/28* (2013.01); *F16B 39/101* (2013.01)

(58) Field of Classification Search
CPC ........ F16B 39/10; F16B 39/101; F16B 31/02; B60B 3/165
USPC .................................. 411/8, 13, 14, 92, 102
See application file for complete search history.

(56) References Cited

U.S. PATENT DOCUMENTS

| | | | | |
|---|---|---|---|---|
| 720,769 | A * | 2/1903 | Woodworth | 411/97 |
| 2,423,918 | A * | 7/1947 | Wohlhieter | 411/97 |
| 4,737,057 | A * | 4/1988 | Olsson | 411/92 |
| 6,158,933 | A * | 12/2000 | Nicholson | 411/14 |
| 6,398,312 | B1 * | 6/2002 | Marczynski et al. | 301/35.622 |
| 7,927,049 | B2 * | 4/2011 | Adams | 411/102 |
| 8,152,426 | B2 * | 4/2012 | Marczynski | 411/14 |
| 8,950,990 | B2 * | 2/2015 | Dooner | 411/8 |
| 2011/0129318 | A1 * | 6/2011 | Davies | 411/516 |

FOREIGN PATENT DOCUMENTS

GB         2392487        * 3/2004

* cited by examiner

*Primary Examiner* — Flemming Saether
(74) *Attorney, Agent, or Firm* — George A. Seaby

(57) ABSTRACT

A lug nut locking device, which provides a visual indication of loosening of one of a pair of adjacent nuts includes a locking strip for extending between the nuts, rings on the ends of the strip for mounting the strip on the nuts, teeth in the rings for resisting nut loosening; and a pair of flags with annular bodies for mounting on the nuts beneath the strip, the flag bodies having internal teeth for engaging the nuts, whereby rotation of one of the nuts causes corresponding rotation of its associated flag providing a visual indication that the nut is loosening.

5 Claims, 2 Drawing Sheets

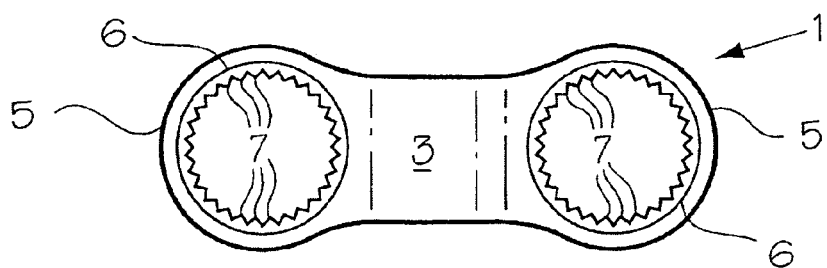
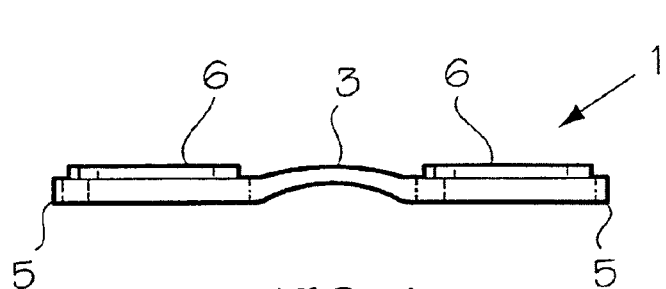
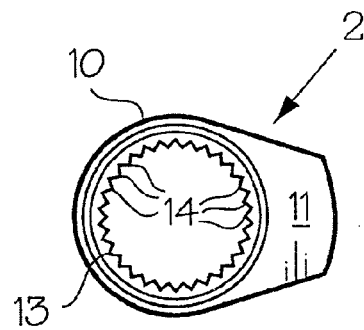
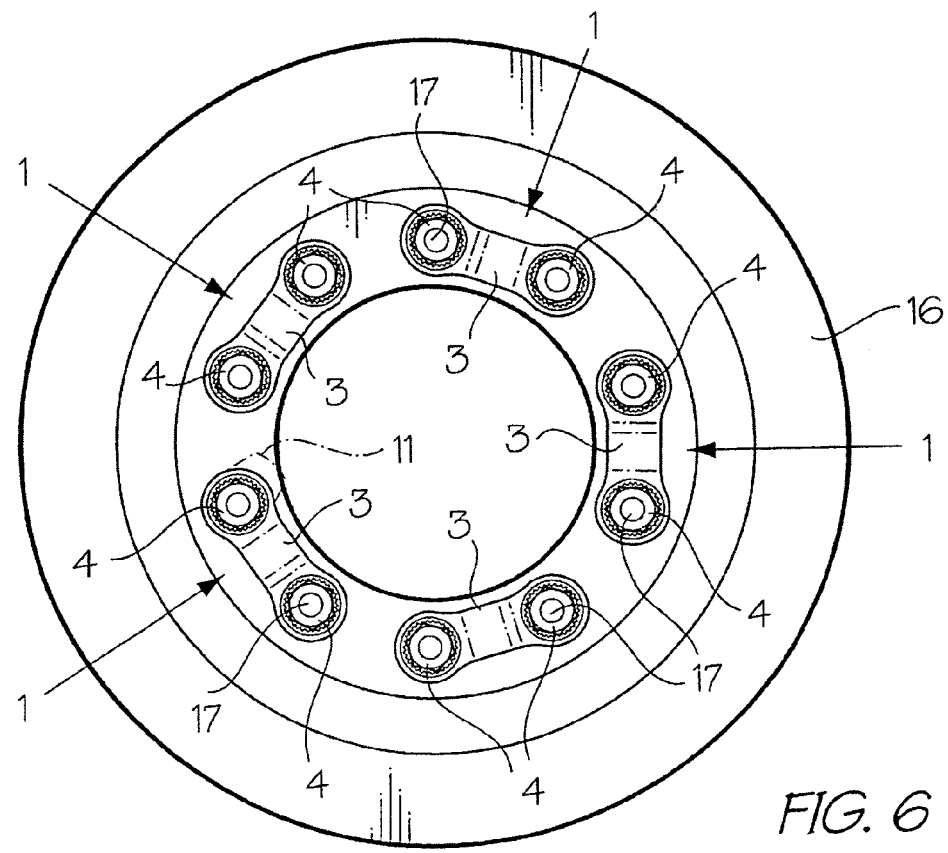

LUG NUT LOCKING DEVICE

FIELD OF THE INVENTION

This invention relates to a lug nut locking device, and in particular to a combination lug nut locking and indicator device.

BACKGROUND OF THE INVENTION

The device of the present invention is intended to lock lug nuts in a tightened position, and to provide a visual indication should a lug nut becomes loose.

Lug nut indicator devices, i.e. devices for indicating that a lug nut has started to loosen are not new. Examples of such devices are described in CA Patent No. 1,231,564, which issued to Rolf Olsson on Jan. 19, 1988; Canadian Patent Application No. 2,637,356, filed by Ifor C. Davies on Jul. 11, 2008; U.S. Pat. No. 4,930,951, issued to Mark A. Gilliam on Jun. 5, 1990; U.S. Pat. No. 6,158,933, issued to Orv Nicholson on Dec. 12, 2000; U.S. Pat. Nos. 6,595,597 and 7,415,888 issued to Michael Marczynski et al on Jul. 22, 2003 and Aug. 26, 2008, respectively; and the James C. Adams US Patent Application No. 2009/0060677, published Mar. 5, 2009.

A problem with some of the basic indicator devices described in the above-listed references is that they merely provide an indication that a lug nut has started to loosen. While some of the devices provide resistance to nut loosening, they are relatively complicated, and may require substantial nut loosening before providing a clear visual signal that loosening has occurred.

SUMMARY OF THE INVENTION

The present invention provides a relatively simple lug nut locking and indicator device which firmly resists rotation of a pair of adjacent lug nuts. However, if loosening of either of the nuts occurs, an indicator flag is rotated into a position providing a visual indication that nut loosening has occurred. In other words, it takes a substantial force for nut loosening to occur, and if loosening happens a visual signal is provided.

In accordance with one aspect, the invention provides a lug nut locking and indicator device comprising: an elongated rigid locking strip having a length sufficient to extend between two adjacent lug nuts; rings on the ends of the locking strip for placing over the adjacent lug nuts; first teeth on interior surfaces of said rings for engaging the nuts and resisting rotation of the lug nuts relative to said strip and rings; indicator flags for mounting on and rotation with said lug nuts, in the use position said flags being axially aligned with said locking strips; whereby rotation of the adjacent lug nuts is firmly resisted by said first teeth on said rings, and, if either of the lug nuts loosens sufficiently to break the first teeth, one of the flags rotates to a position out of axial alignment with the locking strip where the flag provides a visual indication of nut loosening.

BRIEF DESCRIPTION OF THE DRAWINGS

The invention is described below in greater detail with reference to the accompanying drawings, which illustrate a preferred embodiment of the invention, and wherein:

FIG. 3 is a top view of a locking strip used in the device of FIGS. 1 and 2;

FIG. 4 is a side view of the locking strip of FIG. 3;

FIG. 5 is a top view of an indicator flag used in the device of FIGS. 1 and 2; and FIG. 6 is a front view of a vehicle wheel with a plurality of indicator and locking devices mounted thereon.

DETAILED DESCRIPTION OF THE INVENTION

Figure 1:
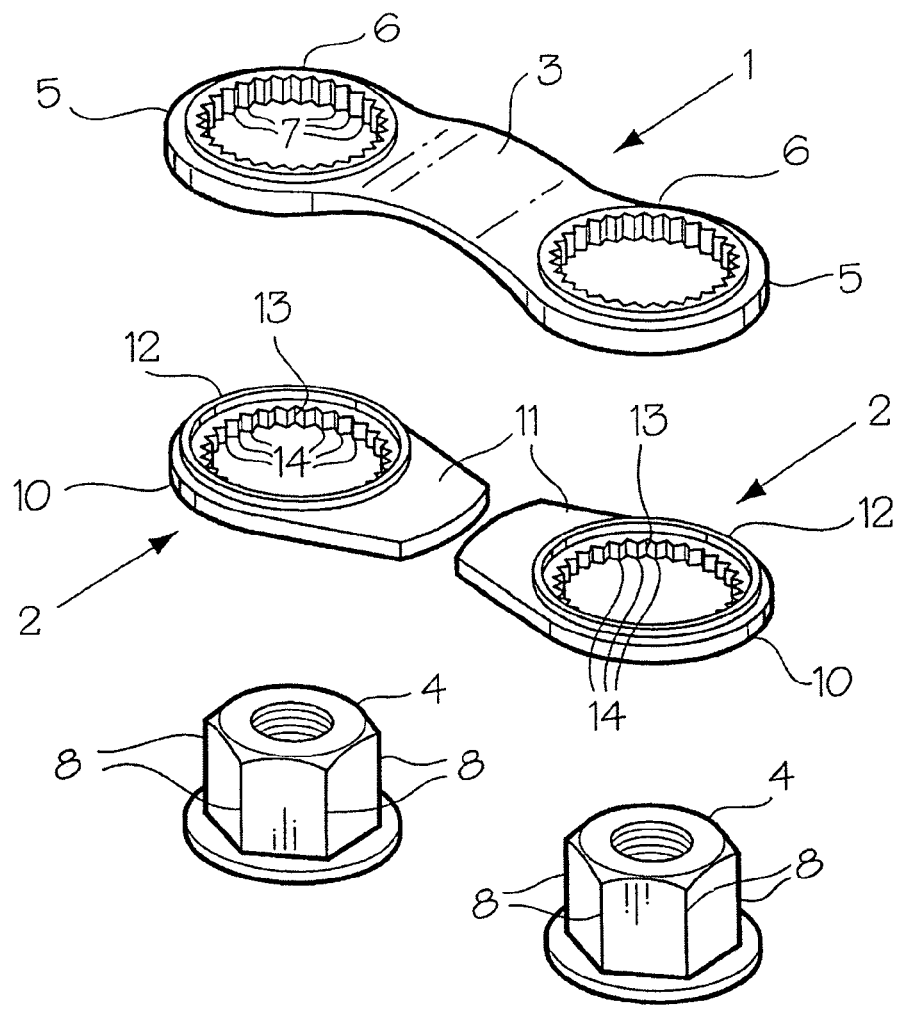
FIG. 1 is an isometric view of a lug nut locking and indicator device in accordance with the present invention.
Figure 2:
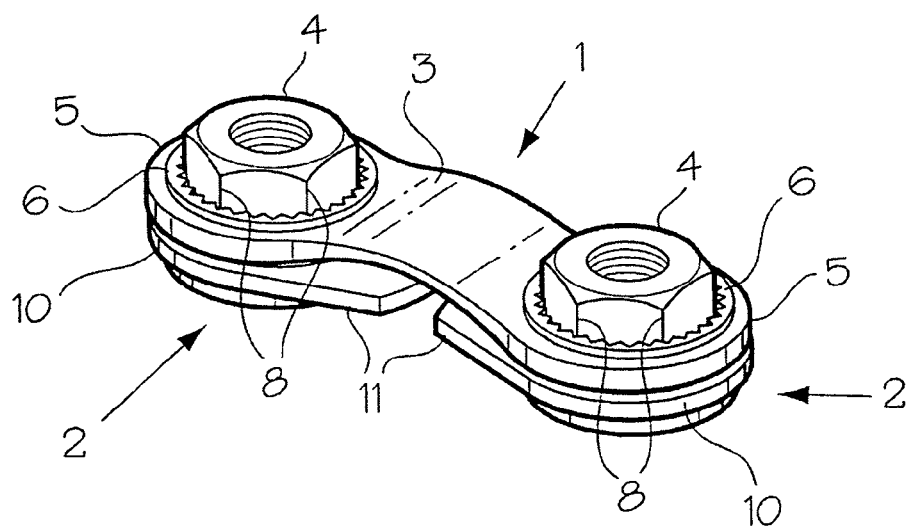
FIG. 2 is an exploded, isometric view of the lug nut locking and indicator device of FIG. 1.

With reference to FIGS. 1 and 2, the basic elements of the lug nut locking and indicator device of the present invention include a locking strip indicated generally at 1 and an indicator flag indicated generally at 2.

As best shown in FIGS. 2-4, the locking strip 1 includes a rigid, slightly arched body 3 formed of hard plastic for extending between adjacent lug nuts 4. A ring 5 is provided at each end of the body 3. The ring 5 is integral with the body 3 and is defined by a hole through the circular ends of the body and an annular flange 6 extending upwardly from the body around the hole. A circular row of teeth 7 extends around the entire inner circumference of the ring 5 for engaging the corners 8 of the lug nut 4.

Referring to FIGS. 1 and 5, each indicator flag 2 is defined by an annular body 10 with a short, tapering arm 11 integral with an extending outwardly from one side thereof. The top or outer surface of the arm 11 is preferably colored with a bright, highly noticeable color such as red. An annular flange 12 extends upwardly from around a hole 13 through the body 10. A row of teeth 14 extends completely around the periphery of the hole 13 for engaging the corners of the lug nut 4.

As illustrated in FIG. 6, the indicator device is used on adjacent lug nuts 4 securing a wheel 16 on a vehicle (not shown). The lug nuts 4 are mounted on bolts 17. In use, a pair of indicator flags 2 is mounted first on adjacent, already tightened lug nuts 4 with the arms 11 pointing towards each other. The teeth 14 in the hole 13 lock the flag 12 on the nut 4, i.e. prevent rotation of the flag relative to the nut 4. The locking strip 1 is then mounted on the adjacent lug nuts 4 above the indicator flags 2, so that the arms 11 of the flags are covered by the body 3 of the strip (FIG. 6). Because the body 3 of the locking strip is rigid, and the teeth 7 engage the corners 8 of the lug nuts 4 rotation of the lug nuts is strongly resisted. If, however, the force of the rotation on one of the lug nuts 4 is sufficient to break the teeth 7 in one of the rings 5, the indicator flag 2 will rotate with the lug nut to a position at an angle or perpendicular to the longitudinal axis of the strip body 3 (e.g. to the position shown in phantom between the eight and nine o'clock positions of the wheel 16). In this position, the flag 2 is no longer aligned with the longitudinal axis of the locking strip 1 and thus provides a visual indicator that the locking nut 4 is loosening. The flange 10 on the flag 2, and the bowed or arched body 3 reduce contact between the strip 1 and the flag 2 to facilitate free rotation of the flag 2 relative to the strip 1.

In the event that the wheel 16 is to be removed from the vehicle, it is merely necessary to remove the locking strip 1 and the indicator flags 2. The internal diameter of the rings 5 on the ends of the strip 1 and the diameter of the holes 13 in the flags 2 are such that the strip 1 and the flags 2 are held in position on the nuts 4 by friction, but can be pried off with a screwdriver or other tool.

Thus, there has been described a relatively simple lug nut locking and indicator device, which strongly resists rotation of a pair of adjacent lug nuts. However, if rotation i.e. loosening of one of the lug nuts should occur, the device provides a visual indication of the event.

The invention claimed is:

1. A lug nut locking and indicator device comprising:
an elongated rigid locking strip having a length sufficient to extend between two adjacent lug nuts;
rings on the ends of the locking strip for placing over the adjacent lug nuts;
first teeth on an interior surfaces of said rings for engaging the nuts and resisting rotation of the lug nuts relative to said strip and rings;
indicator flags for mounting on and rotation with said lug nuts, in the use position said flags being axially aligned with said locking strip;
whereby rotation of the adjacent lug nuts is firmly resisted by said first teeth on said rings, and, if either of the lug nuts loosens sufficiently to break the first teeth, one of the flags rotates to a position out of axial alignment with the locking strip were the flat provides a visual indication of nut loosening.

2. The device of claim 1, wherein said first teeth are integral with and extend completely around the interior of each said ring.

3. The device of claim 1, wherein each indicator flag includes an annular body; a plurality of second teeth on an interior surface of said annular body for engaging a lug nut; and a strip extending radially outwardly from said body.

4. The device of claim 3, wherein each said indicator flag includes an annular top flange for engaging the rigid body when the flag is mounted on the lug nut beneath the rigid body, facilitating rotation of the indicator flag relative to the locking strip.

5. The device of claim 4, wherein said rigid body is bowed outwardly away from the indicator flag, providing unrestricted movement of the flag relative to the rigid body.

* * * * *